United States Patent [19]

Panster et al.

[11] Patent Number: 5,354,831

[45] Date of Patent: Oct. 11, 1994

[54] SHAPED ORGANOPOLYSILOXANES CONTAINING SULFONATE GROUPS, A PROCESS FOR THEIR PRODUCTION AND THEIR USE

[75] Inventors: Peter Panster, Rodenbach; Peter Kleinschmit, Hanau, both of Fed. Rep. of Germany

[73] Assignee: Degussa Aktiengesellschaft, Frankfurt, Fed. Rep. of Germany

[21] Appl. No.: 85,960

[22] Filed: Jul. 6, 1993

[30] Foreign Application Priority Data

Jul. 17, 1992 [DE] Fed. Rep. of Germany ....... 4223539

[51] Int. Cl.$^5$ ............ C07F 7/08; C07F 5/06; C07F 7/28; C08G 77/22
[52] U.S. Cl. .......................... 528/9; 556/9; 556/10; 556/173; 556/428; 528/30
[58] Field of Search .............. 556/9, 10, 173, 428; 528/30, 9

[56] References Cited

U.S. PATENT DOCUMENTS

| | | | |
|---|---|---|---|
| 3,496,126 | 2/1970 | Burzynski | 260/9 |
| 4,017,528 | 4/1977 | Unger et al. | 252/426 |
| 4,238,590 | 12/1980 | Scholze et al. | 528/5 |
| 4,362,885 | 12/1982 | Panster et al. | 556/446 |
| 4,410,669 | 10/1983 | Panster et al. | 525/474 |
| 4,424,332 | 1/1984 | Panster et al. | 528/30 |
| 4,455,415 | 6/1984 | Panster et al. | 528/39 |
| 4,552,700 | 11/1985 | Panster et al. | 556/9 |
| 4,595,740 | 6/1986 | Panster et al. | 528/30 |
| 4,645,847 | 2/1987 | Panster et al. | 556/9 |
| 4,647,644 | 3/1987 | Panster et al. | 528/30 |
| 4,647,679 | 3/1987 | Panster et al. | 556/9 |
| 4,647,682 | 3/1987 | Panster et al. | 556/431 |
| 4,465,848 | 2/1987 | Panster et al. | 556/9 |
| 4,758,277 | 7/1988 | Spruegel et al. | 106/36 |
| 4,772,457 | 9/1988 | Panster et al. | 423/561 R |
| 4,845,163 | 7/1989 | Panster et al. | 528/475 |
| 4,855,470 | 8/1989 | Panster et al. | 556/421 |
| 4,954,599 | 9/1990 | Panster et al. | 528/38 |
| 4,999,413 | 3/1991 | Panster et al. | 528/30 |
| 5,003,024 | 3/1991 | Panster et al. | 528/30 |
| 5,019,637 | 5/1991 | Panster et al. | 528/10 |

(List continued on next page.)

FOREIGN PATENT DOCUMENTS 0008902 3/1980 European Pat. Off. .
0098946 1/1984 European Pat. Off. .

(List continued on next page.)

OTHER PUBLICATIONS

W. Neier, Chem. Ind. 33, (1981), pp. 632–637.
JP 87-330603 cited in CIP Profile Booklet 1987, English language Abstract.

(List continued on next page.)

Primary Examiner—Melvyn I. Marquis
Assistant Examiner—Margaret W. Glass
Attorney, Agent, or Firm—Beveridge, DeGrandi, Weilacher & Young

[57] ABSTRACT

Disclosed are shaped organopolysiloxanes containing sulfonate groups and consisting of units $$(O_{3/2}Si-R^1-SO_3^-)_x M^{x+} \qquad (I)$$

in which $R^1$ is an alkylene group, x is a number from 1 to 4 depending on M, and M is hydrogen or a monovalent to tetravalent optionally complex metal ion, and the valencies of the silicon linked oxygen atoms are saturated by silicon atoms of other groups (I) or by cross-linking silicon and aluminum compounds, the ratio of the silicon atoms in (I) to the silicon and aluminum atoms of the crosslinker being from 1:4 to 1:20. The organopolysiloxanes containing sulfonate groups are present in the form of spherical particles with a diameter of 0.01 to 3 mm, a specific surface of 0.1 to 1200 m$^2$/g, a specific pore volume of 0.01 to 6 ml/g, and an apparent density of 50 to 1000 g/l. Also disclosed are processes for the production of the shaped sulfonated organopolysiloxanes and to their use as a solid acid catalyst.

31 Claims, No Drawings

U.S. PATENT DOCUMENTS

| | | | |
|---|---|---|---|
| 5,061,773 | 10/1991 | Panster et al. | 528/9 |
| 5,093,451 | 3/1992 | Panster et al. | 528/9 |
| 5,094,831 | 3/1992 | Klockner et al. | 423/342 |
| 5,126,473 | 6/1992 | Klockner et al. | 556/473 |
| 5,130,396 | 7/1992 | Panster et al. | 528/9 |
| 5,132,337 | 7/1992 | Panster et al. | 523/117 |
| 5,187,134 | 2/1993 | Panster | 502/158 |

FOREIGN PATENT DOCUMENTS

| | | |
|---|---|---|
| 1800371 | 8/1969 | Fed. Rep. of Germany . |
| 2357184 | 5/1975 | Fed. Rep. of Germany . |
| 3226093 | 1/1984 | Fed. Rep. of Germany . |
| 3518881A1 | 11/1986 | Fed. Rep. of Germany . |
| 4142129 | 7/1993 | Fed. Rep. of Germany . |
| 2413416 | 12/1978 | France . |
| 92/10528 | 6/1992 | PCT Int'l Appl. . |
| 1238703 | 9/1968 | United Kingdom . |
| 1506226 | 4/1978 | United Kingdom . |

OTHER PUBLICATIONS

JP 62 235 330 cited in Hochmolekularbericht 1990; English language equivalent is Chemical Abstracts 108: 168541z, 1988, vol. 108, No. 20.

Nippon Kagaku Kaishai 1990, 5: 478–482 cited in Hochmolekularbericht 1991; English language equivalent is Chemical Abstracts 112: 21359v, vol. 112, No. 41.

Widdecke, H., "Polystyrene–supported Acid Catalysts", British Polymer Journal (1984), vol. 16, pp. 188–192, was cited on p. 2, lines 23–24 of the present application.

SHAPED ORGANOPOLYSILOXANES CONTAINING SULFONATE GROUPS, A PROCESS FOR THEIR PRODUCTION AND THEIR USE

BACKGROUND AND INTRODUCTION

The present invention relates to shaped organopolysiloxanes containing sulfonate groups which, in terms of process technology and performance, have the advantage of a macroscopic spherical shape in comparison to previously developed organopolysiloxanes containing sulfonate groups (DE 32 26 093 corresponding to U.S. Pat. No. 4,552,700 which is incorporated by reference). The present invention also relates to processes by which these new products can be produced, not only in the ideal particle size for the particular application described below but also with suitable physical properties. The present invention also relates to processes for using these shaped organopolysiloxanes.

Strongly acidic cation exchangers, of which the functional groups consist of sulfonic acid units, are used not only in the desalination, purification and softening of water and aqueous solutions and in the production of drinking water, but also and above all as a solid acid catalyst in chemical syntheses or as a support for metal catalysts (see Haag et al., DE-OS 18 00 371; W. Neier, Chem. Ind. 33, (1981), page 632). The types used almost exclusively in the catalytic field always consist in principle of an organic, partly crosslinked polystyrene skeleton to which the sulfonate groups are attached by the phenyl rings.

Commensurate with this structure, the physical and chemical properties of these cation exchangers are forged by the organic character of the polymer backbone which gives rise to a number of performance-related disadvantages, such as a relatively low heat resistance of 100° to 130° C., an occasionally high sensitivity to chemical attack and bacterial contamination which can culminate in complete degradation of the matrix, solubility in certain solvents under drastic conditions, strong swellability and dependence of the exchanger volume upon the ambient medium, the need for swelling to make the functional groups accessible and, hence, non-useability in certain organic solvents.

Although inorganic polymer systems (e.g., silica gel) have the advantages of a fixed and rigid structure, non-swellability, high heat and ageing resistance, insolubility in organic media and water (see EP 0 008 902; GB 1,506,226), cation exchangers in the H+ form produced on this basis only have a maximum capacity of 0.5 to 0.6 meq/g on account of the relatively small number of functional groups. In addition, since—for steric reasons—the SO₃H—bearing groups are only anchored to the support surface by a maximum of 1 to 1.5 siloxane bonds, they are always in danger of breaking free. The prior art on ion exchangers in general is described in synoptic form, for example, in Ullmanns Enzyklopädie der techn. Chemie, 4th Edition, Vol. 13, page 29. Information on acid catalysis using acidic ion exchangers is provided by H. Widdecke in British Polymer Journal (1984), Vol. 16, pages 188 to 192.

DE-PS 32 26 093 (U.S. Pat. No. 4,552,700) describes organopolysiloxanes containing sulfonate groups which may also be used as solid acid catalysts, which have an organopolysiloxane backbone resistant to partial or complete dissolution in aqueous media, and in which the sulfonate groups are anchored to the matrix by organic spacer groups. These systems enjoy the advantages of an inorganic polymer backbone and have a relatively high capacity for sulfonate groups of which the anchorage is guaranteed by an Si atom incorporated in the matrix by a trivalent bond. In addition, the matrix of these polymers may be modified and adapted to meet requirements by the incorporation of non-functional silicon, titanium and aluminum units. However, the fact that the macroscopic appearance of these products is unsatisfactory has hitherto proved to be unfavorable because these polymers are present as asymmetrical coarse or fine particles and not in the applicationally favorable spherical form. In addition, their physical and morphological properties are not optimal.

SUMMARY OF THE INVENTION

An object of the present invention is to reproducibly provide organopolysiloxanes containing sulfonate groups (of the type described in principle in DE-PS 32 26 093 and U.S. Pat. No. 4,552,700) in spherical form and with the required physical properties. The shaped organopolysiloxanes comprise units corresponding to the following formula:

$$(O_{3/2}Si-R^1-SO_3^-)_x M^{x+} \quad (I)$$

in which $R^1$ is a linear or branched $C_{1-12}$ alkylene group, a $C_{5-8}$ cycloalkylene group, or a unit corresponding to the formula:

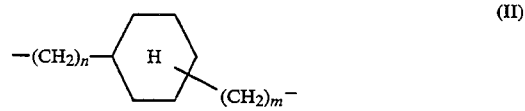

(II)

or

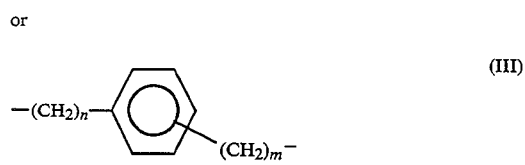

(III)

where n and m are numbers from 0 to 6, x is a number from 1 to 4 depending on M, and M is hydrogen or a monovalent to tetravalent, optionally complex metal ion, and the valencies of the silicon linked oxygen atoms are saturated by silicon atoms of other groups (I) and/or by one or more metal atom oxygen groups of the crosslinking bridge members

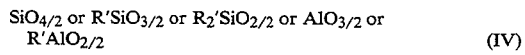

$$SiO_{4/2} \text{ or } R'SiO_{3/2} \text{ or } R_2'SiO_{2/2} \text{ or } AlO_{3/2} \text{ or } R'AlO_{2/2} \quad (IV)$$

where R' is a linear or branched $C_{1-5}$ alkyl group or a phenyl group, the ratio of the silicon atoms in (I) to the sum of the silicon and aluminum atoms of the crosslinking agent (IV) being from 1:4 to 1:20.

The shaped organopolysiloxanes are macroscopically spherical particles having a diameter of 0.01 to 3.0 mm (preferably 0.05 to 2.0 mm), a specific surface of 0.01 to 1200 m²/g (preferably 10 to 800 m²/g), a specific pore volume of 0.01 to 6.0 ml/g, and an apparent density of 50 to 1000 g/l (preferably 100 to 800 g/l).

Another object of the present invention is to provide a process for the production of the shaped organopolysiloxanes containing sulfonate groups according to the present invention as described above and in (a–g) below. The process involves reacting an aqueous solution of a sulfonated organosilicon compound corresponding to the following formula:

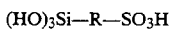

(HO)$_3$Si—R—SO$_3$H (XII)

or siloxane derivatives thereof condensed via oxygen bridges, R$^1$ being a linear or branched C$_{1-12}$ alkylene group, a C$_{5-8}$ cycloalkylene group or a unit corresponding to the following formula:

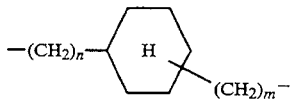

(II)

or

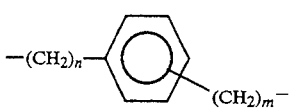

(III)

where n and m are numbers of 0 to 6 according to the desired stoichiometric composition of the organopolysiloxane to be produced, with one or more crosslinker components

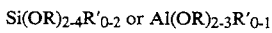

Si(OR)$_{2-4}$R'$_{0-2}$ or Al(OR)$_{2-3}$R'$_{0-1}$ (XIII)

or derivatives condensed via oxygen bridges, R' being a linear or branched C$_{1-5}$ alkyl group or a phenyl group, with stirring below or at room temperature to 100° C. in the presence or absence of a substantially water-miscible solvent, the reaction mixture is left to gel below or at room temperature to 100° C., 5 to 1000% by weight (preferably 5 to 100% by weight), based on the total quantity in the aqueous solution of sulfonated organosilicon compound (XII) and crosslinker component (XIII), of a substantially water-miscible solvent or water is added to the developing gel, optionally at the beginning of gel formation or up to 1 hour thereafter, followed by homogenization, after which 20 to 2000% by weight (preferably 50 to 500% by weight) based on the total quantity in the aqueous solution of sulfonated organosilicon compound (XII) and crosslinker component (XIII), of a substantially water-insoluble solvent is added to the viscous homogenizate either immediately or over a period of up to 2 hours, optionally with an increase in the temperature originally adjusted, the siloxane-containing aqueous phase is dispersed in the liquid two-phase system and the solid forming as spheres is separated from the liquid phase after a sufficient reaction time at room temperature to 200° C. and is then optionally extracted, dried at room temperature to 200° C., optionally in an inert gas atmosphere or in vacuo, and tempered for 1 to 100 hours at 150° to 230° C. and/or graded into particle sizes.

DETAILED DESCRIPTION OF THE INVENTION

The ratio between the component corresponding to formula (I) and to formula (IV) can vary very considerably within the indicated limits of 1:4 to 1:20 without any problems arising out of the morphological, physical or chemical properties of the products according to the present invention or in the corresponding production processes. Of the crosslinking bridge members according to formula (IV), all five types shown may in principle be represented.

The ratios to be selected in practice are determined primarily by the particular applications and application conditions envisaged and by the chemical and physical properties required for those applications.

The type and number of crosslinking groups used have a specific material-related and/or performance-related effect. For example, the structural strength of the organopolysiloxane containing sulfonate groups where it is used in aggressive organic or aqueous media can be increased by a relatively high proportion of the crosslinking group SiO$_{4/2}$. The group R'SiO$_{3/2}$ or R$_2$'SiO$_{2/2}$ has a hydrophobicizing effect and, in the second case, also an elasticizing effect. The incorporation of aluminum-containing oxane units means more acid centers in the matrix.

Since the shaped organopolysiloxanes containing sulfonate groups according to the present invention are used above all as solid acid catalysts, the polymers present in the H$^+$ form according to the following represent the most important systems:

(a) Shaped organopolysiloxanes containing sulfonate groups as described in the Summary characterized in that formula (I) stands for a unit

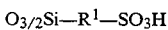

O$_{3/2}$Si—R$^1$—SO$_3$H (V)

and R$^1$ has the same meaning as in the Summary.

(b) Shaped organopolysiloxanes containing sulfonate groups as described in the Summary and in (a) above, characterized in that formula (I) stands for a unit

O$_{3/2}$Si—CH$_2$CH$_2$CH$_2$—SO$_3$H (VI).

This also applies from the point of view of production, in which the acid form is particularly readily accessible and is primarily obtained first. All other forms, in which M in formula (I) does not represent H, are formed from this H$^+$ form in the course of an ion exchange or a neutralization phase, in which case M can also be a complex, catalytically active metal.

Particular advantages in regard to the availability of the starting materials and their properties are achieved with organopolysiloxanes containing sulfonate groups, in which R$^1$ is a propylene group in accordance with the following:

(b) Shaped organopolysiloxanes containing sulfonate groups as described in the Summary and in (a) above, characterized in that formula (I) stands for a unit

O$_{3/2}$Si—CH$_2$CH$_2$CH$_2$—SO$_3$H (VI).

(c) Shaped organopolysiloxanes containing sulfonate groups as described in the Summary and in (a, b) above having the following composition:

O$_{3/2}$Si—CH$_2$CH$_2$CH$_2$—SO$_3$H.a SiO$_{4/2}$ (VII)

in which a is a number from 4 to 20.

(d) Shaped organopolysiloxanes containing sulfonate groups as described in the Summary and in (a, b) above having the following composition:

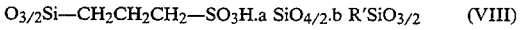

O$_{3/2}$Si—CH$_2$CH$_2$CH$_2$—SO$_3$H.a SiO$_{4/2}$.b R'SiO$_{3/2}$ (VIII)

in which a and b ≧ 1 and the sum of a and b is a number from 4 to 20 and R' has the same meaning as in the Summary.

(e) Shaped organopolysiloxanes containing sulfonate groups as described in the Summary and in (a, b) above having the following composition:

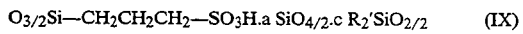
O$_{3/2}$Si—CH$_2$CH$_2$CH$_2$—SO$_3$H.a SiO$_{4/2}$.c R$_2$'SiO$_{2/2}$   (IX)

in which a and c ≧ 1 and the sum of a and c is a number from 4 to 20 and R' has the same meaning as in the Summary.

(f) Shaped organopolysiloxanes containing sulfonate groups as described in the Summary and in (a, b) above having the following composition:

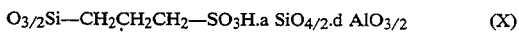
O$_{3/2}$Si—CH$_2$CH$_2$CH$_2$—SO$_3$H.a SiO$_{4/2}$.d AlO$_{3/2}$   (X)

in which a and d ≧ 1 and the sum of a and d is a number from 4 to 20.

(g) Shaped organopolysiloxanes containing sulfonate groups as described in the Summary and in (a, b) above having the following composition:

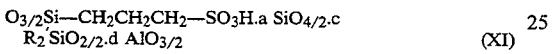
O$_{3/2}$Si—CH$_2$CH$_2$CH$_2$—SO$_3$H.a SiO$_{4/2}$.c R$_2$'SiO$_{2/2}$.d AlO$_{3/2}$   (XI)

in which a, c and d ≧ 1 and the sum of a, c and d is a number from 4 to 20.

The monomers used in the production of the shaped products according to the present invention are standard known compounds in regard to the crosslinking bridge members. The monomer form of the unit bearing sulfonate groups is described in German patent application P 41 42 129.9 (corresponding to U.S. patent application Ser. No. 07/993,009 filed on Dec. 18, 1992, now pending which is incorporated by reference).

The compositions mentioned in (c–g) above have proved to be particularly effective combinations from the various aspects of catalytic application.

The same also applies to the form of the statistical copolycondensate in which the components corresponding to formulae (I) and (IV) are statistically distributed in accordance with the molar ratios of the starting products; i.e., the shaped organopolysiloxanes containing sulfonate groups as described in the Summary or (b–g) above characterized in that they are present as so-called statistical copolycondensates in regard to the units corresponding to formulae (I) and (IV). In principle, block and mixed copolycondensates may of course also be produced.

The present invention also relates to processes for the production of the shaped organopolysiloxanes containing sulfonate groups according to the present invention as described in the Summary and in (a–g) above.

The process for the production of the shaped organopolysiloxanes containing sulfonate groups as described in the Summary and (a–g) above involves:

(i) reacting an aqueous solution of a sulfonated organosilicon compound corresponding to the following formula:

(HO)$_3$Si—R—SO$_3$H   (XII)

or siloxane derivatives thereof condensed via oxygen bridges, R$^1$ being a linear or branched C$_{1-12}$ alkylene group, a C$_{5-8}$ cycloalkylene group or a unit corresponding to the following formula:

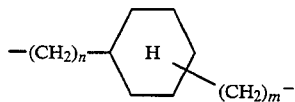
(II)

or

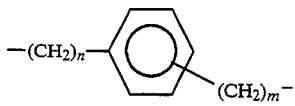
(III)

where n and m are numbers of 0 to 6 according to the desired stoichiometric composition of the organopolysiloxane to be produced, with one or more crosslinker components Si(OR)$_{2-4}$R'$_{0-2}$ or Al(OR)$_{2-3}$R'$_{0-1}$   (XIII)

or derivatives condensed via oxygen bridges, R' being a linear or branched C$_{1-5}$ alkyl group or a phenyl group, with stirring below or at room temperature to 100° C. in the presence or absence of a substantially water-miscible solvent to form a reaction mixture, (ii) the reaction mixture is left to gel below or at room temperature to 100° C.; 5 to 1000% by weight (preferably 5 to 100% by weight) of a substantially water-miscible solvent or water (% by weight based on the total quantity in the aqueous solution of sulfonated organosilicon compound (XII) and crosslinker component (XIII)) is added to the developing gel, optionally at the beginning of gel formation or up to 1 hour thereafter; this is followed by homogenization, after which 20 to 2000% by weight (preferably 50 to 500% by weight) of a substantially water-insoluble solvent (% by weight based on the total quantity in the aqueous solution of sulfonated organosilicon compound (XII) and crosslinker component (XIII)) is added to the viscous homogenizate either immediately or over a period of up to 2 hours, optionally with an increase in the temperature originally adjusted; the siloxane-containing aqueous phase is dispersed in the liquid two-phase system and the solid forming as spheres is separated from the liquid phase after a sufficient reaction time at room temperature to 200° C.; the spheres are then optionally extracted, dried at room temperature to 200° C. (optionally in an inert gas atmosphere or in vacuo), and tempered for 1 to 100 hours at 150° to 230° C., and/or graded into particle sizes.

Depending on the concentration of the sulfonated organosilicon compound (XII) in the aqueous solution, condensed derivatives may also be present; for example having the following composition:

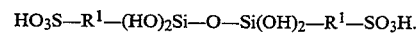
HO$_3$S—R$^1$—(HO)$_2$Si—O—Si(OH)$_2$—R$^1$—SO$_3$H.

The same also applies to the crosslinking components corresponding to formula (XIII) used which, in principle, may be present in the form of oligomeric compounds which, in the case of the silicic acid ester for example, have the following composition:

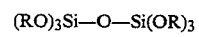
(RO)$_3$Si—O—Si(OR)$_3$

A corresponding commercially available product is, for example, the so-called "Ester 40" which has a theoretical $SiO_2$ content of 40% by weight.

The addition of a water-miscible solvent (e.g., linear or branched $C_{1-5}$ alcohols) to the mixture to be gelled, consisting of the aqueous solution of the sulfonated organosilicon compound (XII) and the crosslinking component (XIII), may prove to be necessary and appropriate above all when separation occurs on account of excessively large organic substituents R' or when a particularly fine-particle shaped product is required. Alternatively, it may also prove to be appropriate in individual cases initially to form a gel from relatively concentrated solution without an addition of solvent and only to dilute the mixture during gel formation or up to one hour thereafter with a water-miscible solvent or with water in order to influence the viscosity of the gel and hence the size of the droplets in the subsequent two-phase system. The size of the droplets and hence the size of the subsequent spheres will of course depend to a large extent on the intensity of stirring.

Since the acid component corresponding to formula (XII) acts as a condensation accelerator, the condensation rate (gelling rate) and the time elapsing up to the onset of gelation will of course basically depend to a large extent upon the concentration of the sulfonated organosilicon compound in the aqueous solution used.

The temperature to be applied in the hydrolysis or gelation phase will be empirically determined in each individual case. It is important in this regard to ensure that a solids-free, liquid-permeated jelly-like mass is retained for the following process step, the so-called forming phase.

The shaping phase accompanying the conversion of the coherent liquid-permeated gel-like mass, in which the condensation reaction continues, into separate spherical particles begins with the addition of a substantially water-insoluble solvent to the gel-forming reaction mixture which may optionally be diluted beforehand with water or a water-miscible solvent. This addition results in the formation of a two-phase system in which the aqueous phase containing the siloxane component is dispersed in the substantially water-insoluble organic solvent and gradually hardens into a spherical solid, optionally with an increase in temperature. The quantity of solvent used for dispersion is gauged so that no lump formation or caking occurs.

The shaped moist product may be separated from the liquid dispersion medium by typical measures known in the art (e.g., decantation, filtration or centrifugation).

In one preferred embodiment, a low-boiling alcohol is optionally used to extract the spherical solid formed. This measure can facilitate drying of the solid providing it does not immediately follow the production process. The so-called tempering step at temperatures of 150° to 230° C. is used to harden and stabilize the shaped solid.

The dried and tempered product may be graded into various particle size fractions using standard equipment known in the art. One or other of the measures used for working up (e.g., extraction, drying, tempering and grading) may be left out according to the particular circumstances. Grading may be carried out on liquid-moist, dried or tempered product.

In principle, any substantially water-immiscible solvent may be used as the organic phase in which the aqueous siloxane-containing phase is dispersed. The following substantially water-insoluble solvents are preferred from the point of view of their handling properties and availability: toluene, o-, m-, p-xylene, a cyclic or open-chain hydrocarbon containing 5 to 8 carbon atoms or a corresponding mixture thereof.

In one particularly important embodiment of the process according to the present invention, the spherical material still moist with water or partly with solvent may be heat-treated for 1 hour to 1 week at temperatures of 50° to 300° C. and preferably at temperatures of 100° to 200° C., if necessary under excess pressure. An inorganic or organic acid (preferably hydrochloric acid) or a metal component may be added to act as a condensation catalyst in addition to the sulfonic acid groups present. This treatment under "steaming" or digesting conditions is mainly used to improve the mechanical strength and porosity of the shaped material.

Shaped organopolysiloxanes containing sulfonate groups in which $M^{x+}$ represents $H^+$ are yielded by the process described in the Summary and by the following:

(h) a process as described in the Summary characterized in that the aqueous solution of the sulfonated organosilicon compound (XII) has an $H^+$ content of 0.1 to 2.5 mol/l and preferably 0.5 to 1.5 mol/l.

(i) a process as described in the Summary or in (h) above characterized in that the water-miscible solvent optionally added before gel formation is a linear or branched $C_{1-5}$ alcohol.

(j) a process as described in the Summary or in (h, i) above characterized in that gel formation is carried out at room temperature to 80° C. under normal pressure or an excess pressure which corresponds to the sum of the partial pressures of the components at the particular temperature applied.

(k) a process as described in the Summary or in (h-j) above characterized in that 5 to 300% by weight and preferably 5 to 50% by weight, based on the total quantity in the aqueous solution of sulfonated organosilicon compound (XII) and crosslinker component (XIII), of a linear or branched $C_{1-5}$ alcohol or water is added to the developing gel either at the beginning of gel formation or up to 1 hour thereafter.

(l) a process as described in the Summary or in (h-k) above characterized in that the substantially water-insoluble solvent, in which the siloxane-containing aqueous phase is dispersed, is toluene, o-, m-, p-xylene, a cyclic or open-chain hydrocarbon containing 5 to 8 carbon atoms or a corresponding mixture thereof.

(m) a process for the aftertreatment of the shaped organopolysiloxanes containing sulfonate groups obtained in accordance with the Summary or in (h–l) above but not dried, characterized in that the solid formed as spheres is heat-treated for 1 hour to up to 1 week at 50° to 300° C. and preferably at 100° to 200° C. in the presence of at least the water component in the liquid phase, if necessary under excess pressure.

(n) a process as described in (m) above characterized in that the aftertreatment is carried out in the presence of an inorganic or organic acid, preferably in the presence of hydrochloric acid, or in the presence of a metal component acting as a condensation catalyst.

Conversion into a corresponding compound, in which $M^{x+}$ stands for a monovalent to tetravalent, optionally complex metal ion, is obtained by ion exchange. This ion exchange may even be carried out in the form of neutralization, as typically encountered in the prior art with known organic ion exchangers.

The cations of the shaped organopolysiloxanes containing sulfonate groups may also be exchanged in an agitated suspension containing the at least partly dissolved, dissociable reagent. This operation can be repeated several times until ion exchange is quantitatively complete. After washing, the ion exchanger now present in the $M^{x+}$ form is optionally dried or directly used as such. Water or even an organic solvent may be used as the liquid phase.

If the dynamic principle is adopted, the starter compound containing sulfonate groups is used as an exchanger bed and contacted with a solution of the at least partly dissolved reactant. As in the case of the products obtained by the static method, aftertreatments may be carried out to the above-mentioned extent in this case, too.

In cases where an exchanger column is used as the exchanger bed, the polymeric starting product must have a certain minimum particle size to guarantee an adequate throughflow. This minimum particle size should also be determined in dependence upon the dimensions of the column. In general, a minimum particle size of 0.2 mm will be sufficient for laboratory columns. On completion of the exchange process, the ion exchanger is again washed free from salts and further worked up in the usual manner known in the art.

The reagents with which the ion exchange process is carried out are inorganic or organic metal salts of main group or secondary metals. If a metal $M^{x+}$ is to be introduced by neutralization, a metal hydroxide, oxide or even alcoholate will be used. Where complex metal ions, such as for example $Cu(NH_3)_4^{2+}$, $Pd(NH_3)_4^{2+}$, $Pt(NH_3)_4^{2+}$, are introduced, salts of these compounds with inorganic or organic anions are again used as starting materials.

In addition to the use as ion exchangers and when $M^{x+}$ is a catalytically active, optionally complex metal ion, for example as a catalyst support, a particularly important use is as a solid acid catalyst in chemical reactions. The main field of application in this regard is in organic syntheses, for example etherification reactions, ether cleavage reactions, esterification reactions, transesterification reactions, isomerization reactions. In these cases, too, the polysiloxane containing sulfonate groups may be used both in a stirred suspension and in a fixed bed.

The new shaped polysiloxanes containing sulfonate groups are characterized in particular by the quantitative hydrolysis yields, by the elemental analyses and by determination of the acid capacity. Depending on the pretreatment, the spherical polysiloxanes containing sulfonate groups have a particle diameter of 0.01 to 3.0 mm (preferably 0.05 to 2.0 mm), a specific surface of 0.01 to 1200 m²/g (preferably 10 to 800 m²/g), a specific pore volume of 0.01 to 6.0 ml/g, and an apparent density of 50 to 1000 g/l (preferably 100 to 800 g/l).

Basically, the chemical and thermal stability of the shaped polysiloxanes containing sulfonate groups are very good and comparable with those of corresponding monomeric compounds. For example, they are capable of withstanding temperatures above 200° C., depending on the ambient medium.

The present invention is illustrated by the following Examples:

EXAMPLE 1

250 ml (225 mmol) of a 0.9-molar aqueous solution of the sulfonated organosilicon compound $(HO)_3Si(CH_2)_3—SO_3H$ were introduced into a three liter glass vessel equipped with a double jacket, KPG stirrer, reflux condenser and dropping funnel. 421.9 g (2.025 mol) $Si(OC_2H_5)_4$ were added dropwise over a period of five minutes with vigorous stirring at a temperature of 40° C., the temperature in the reactor gradually rising to 60° C. After the dropwise addition, the contents of the reactor were cooled to 35° C. and stirred for about 45 minutes until the clear solution began to thicken appreciably. 1300 ml technical xylene were then added all at once to the developing gel. The two-phase system, the siloxane-containing aqueous/alcoholic phase and the organic xylene phase, was stirred for another hour at approx. 40° C., the formation of small spheres from the aqueous/alcoholic phase being observed after only a short time. The suspension was then heated to the reflux temperature, stirred for 1.5 h at that temperature and then cooled. After the supernatant organic phase had been filtered off under suction, 500 ml of a 1N HCl solution was added to the solid present in the form of small spheres, followed by stirring for 48 h at 150° C. in an enamelled autoclave under the pressure spontaneously established. After cooling, the HCl-containing phase was filtered off under suction and the solid remaining was washed until free from HCl. After drying for 24 hours at 120° C., 165 g of a polysiloxane containing sulfonate groups present in the form of small spheres and consisting of units corresponding to the formula

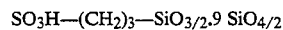

$SO_3H—(CH_2)_3—SiO_{3/2}.9\ SiO_{4/2}$ were obtained.
Particle size distribution:
  20% 1.0–1.4 mm
  80% 0.1–1.0 mm
Apparent density:
  320 g/l
Pore volume:
  2.5 ml/g (solely meso- and macropores, i.e. pore diameter >2 nm)
Specific surface:
  530 m²/g
H+ capacity:
  0.96 mVal H+/g

| Elemental analysis: | % C | % H | % Si | % S |
|---|---|---|---|---|
| Calculated: | 5.0 | 1.0 | 39.2 | 4.5 |
| Found: | 4.6 | 0.8 | 38.7 | 4.2 |

EXAMPLE 2

In a cylindrical one liter glass vessel (HWS vessel) equipped with a double jacket, KPG stirrer, reflux condenser and dropping funnel, 175.77 ml (175.8 mol) of a 1.0 molar aqueous solution of a sulfonated organosilicon compound having the formula $(HO)_3Si(CH_2)_3—SO_3H$ were heated to 60° C. Within one minute, 185 g so-called "Ester 40", a partial condensate of $Si(OC_2H_5)_4$ with a theoretical $SiO_2$ content of 40% by weight, and 26.1 g (175.8 mol) $(H_3C)_2Si(OC_2H_5)_2$ were added to the sulfonate solution. After addition of 80 ml ethanol, the solution was first stirred for 30 minutes at 70° C., cooled to 50° C. and then stirred for about another 30 minutes until a gel began to form. One minute after the beginning of gel formation, 50 ml water and then 850 ml toluene were added to the developing gel. The two-phase system was heated to the reflux temperature and stirred for another three hours at that temperature. After cooling and filtration under suction of the liquid phase, the solid present in the form of spheres was stirred for 24 h at 160° C. in 300 ml of 2N acetic acid. The solid filtered off was then washed with water, subsequently dried to a residual moisture content of approx. 50% by weight and fractionated into various particle sizes. 116 g shaped product consisting of polymer units corresponding to the following formula

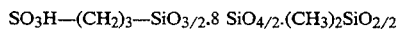

$SO_3H$—$(CH_2)_3$—$SiO_{3/2}.8\ SiO_{4/2}.(CH_3)_2SiO_{2/2}$ were obtained. 90% of this product had a particle size of 0.1 to 2.2 mm.
Apparent density:
  360 g/l
Pore volume:
  1.8 ml/g (solely meso- and macropores, no micropores)
Specific surface:
  590 m²/g
H⁺ capacity:
  0.82 mVal/g

| Elemental analysis: | % C | % H | % Si | % S |
|---|---|---|---|---|
| Calculated: | 8.2 | 1.7 | 38.5 | 4.4 |
| Found: | 7.9 | 1.5 | 37.6 | 4.2 |

EXAMPLE 3

200 ml (140 mmol) of a 0.7-molar aqueous solution of a sulfonated organosilicon compound having the formula:

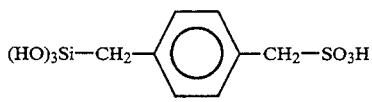

$(HO)_3Si$—$CH_2$—⟨C₆H₄⟩—$CH_2$—$SO_3H$ were combined with 370.2 g (1.4 mol) $Si(OC_3H_7)_4$ and 69.0 g (280 mol) $Al(OC_4H_9)_3$ in a cylindrical glass vessel (HWS vessel) equipped with a double jacket, KPG stirrer, reflux condenser and dropping funnel. The temperature in the reactor rose to 70° C. After stirring at that temperature for ten minutes, the mixture was cooled to 35° C. and stirred until a gel began to form. Immediately after the onset of gel formation, 1200 ml xylene were added to the developing gel. In the same way as in Example 1, 135.0 g of a polysiloxane containing sulfonate groups consisting of units corresponding to the following formula

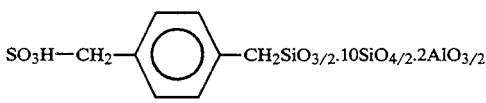

$SO_3H$—$CH_2$—⟨C₆H₄⟩—$CH_2SiO_{3/2}.10SiO_{4/2}.2AlO_{3/2}$ were obtained in the form of small spheres. 90% of the product had a particle size of 0.05 to 0.4 mm.
Apparent density:
  280 g/l
Pore volume:
  1.9 ml/g
Specific surface:
  480 m²/g
H⁺ capacity:
  0.65 mVal/g

| Elemental analysis: | % C | % H | % Si | % S | % Al |
|---|---|---|---|---|---|
| Calculated: | 9.9 | 0.9 | 31.8 | 3.3 | 2.8 |
| Found: | 9.4 | 0.8 | 31.2 | 3.0 | 2.7 |

EXAMPLE 4

250 ml (225 mmol) of a 0.9-molar aqueous solution of the sulfonated organosilicon compound $(HO)_3Si(CH_2)_3$—$SO_3H$ were reacted as in Example 1 with 281.2 g (1.35 mol) $Si(OC_2H_5)_4$ and 73.9 g (450 mmol) $C_3H_7$—$Si(OCH_3)_3$. After a two hour reflux phase, the spherical solid was directly washed with water and alcohol, i.e. without any further heat treatment, until free from acid. After drying for 24 hours at 100° C. in a nitrogen atmosphere, 162 g of a polysiloxane containing sulfonate groups and consisting of units corresponding to the following formula:

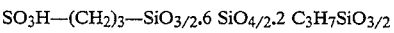

$SO_3H$—$(CH_2)_3$—$SiO_{3/2}.6\ SiO_{4/2}.2\ C_3H_7SiO_{3/2}$ were obtained. 90% of the product had a particle size of 0.2 to 1.6 mm.
Apparent density:
  490 g/l
Pore volume:
  0.9 ml/g
Specific surface:
  320 m²/g
H⁺ capacity:
  0.75 mVal/g
The results of the elemental analyses were in accordance with the theoretical values.

EXAMPLE 5

100 ml of the polysiloxane containing sulfonate groups produced in accordance with Example 1, consisting of units corresponding to the formula $SO_3H$—$(CH_2)_3$—$SiO_{3/2}.9\ SiO_{4/2}$ and having a particle size of 0.1 to 1.0 mm, were moistened and transferred to a column having an internal diameter of 20 mm. The column was charged with 3×100 ml 0.5N $CuCl_2$ solution in one hour and then washed free from salts with a total of two liters water. After the treated solid had been dried for 24 hours at 120° C. in a nitrogen atmosphere, a polysiloxane was obtained and, according to elemental analysis, had the following composition:

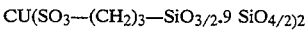

$CU(SO_3$—$(CH_2)_3$—$SiO_{3/2}.9\ SiO_{4/2})_2$

EXAMPLE 6

30 ml of the polysiloxane containing sulfonate groups produced in accordance with Example 1, consisting of units corresponding to the formula $SO_3H$—$(CH_2)_3$—$SiO_{3/2}.9\ SiO_{4/2}$ and having a particle size of 0.4 to 1.0 mm, were introduced into an externally heated metal tube with an internal diameter of 12 mm.

The acid catalyst bed was charged with 50 g/h methyl-t-butyl ether which were evaporated in a preceding evaporator unit. The gases leaving the catalyst bed were analyzed in a following gas chromatograph. For a reaction temperature of 200° C., a conversion of the methyl-t-butyl ether of approx. 99% was achieved over the 48 hour test period. More than 95% of the expected reaction products, methanol and isobutene, were obtained.

Further variations and modifications of the foregoing will be apparent to those skilled in the art and such variations and modifications are attended to be encompassed by the claims that are appended hereto.

German Priority Application P 42 23 539.1, filed on Jul. 17, 1992, is relied on and incorporated by reference.

What is claimed:

1. A shaped organopolysiloxane comprising sulfonate groups and units corresponding to the following formula (I):

in which $R^1$ is a linear or branched $C_{1-12}$ alkylene group, a $C_{5-8}$ cycloalkylene group or a unit corresponding to the formula (II) or (III):

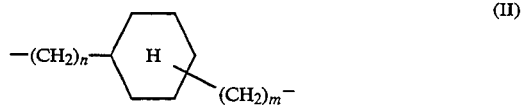

or

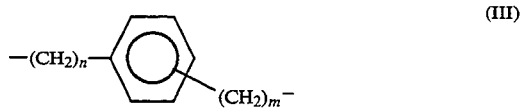

where n and m are numbers from 0 to 6, x is a number from 1 to 4 depending on M, and M is hydrogen or a monovalent to tetravalent optionally complex metal ion, and the valencies of the silicon linked oxygen atoms are saturated by silicon atoms of other groups (I) and/or by one or more metal atom oxygen groups of the crosslinking bridge members (IV):

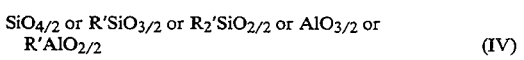

where R' is a linear or branched $C_{1-5}$ alkyl group or a phenyl group, the ratio of the silicon atoms in (I) to the sum of the silicon and aluminum atoms of said crosslinking agent (IV) being from 1:4 to 1:20, wherein said shaped organopolysiloxane is a macroscopically spherical particle having a diameter of 0.01 to 3 mm, a specific surface of 0.01 to 1200 m²/g, a specific pore volume of 0.01 to 6 ml/g, and an apparent density of 50 to 1000 g/l.

2. The shaped organopolysiloxane according to claim 1, wherein said shaped organopolysiloxane is a macroscopically spherical particle having a diameter of 0.05 to 2 mm, a specific surface of 10 to 800 m²/g and an apparent density of 100 to 800 g/l.

3. The shaped organopolysiloxane according to claim 1, wherein said formula (I) is

and $R^1$ has the same meaning as in claim 1.

4. The shaped organopolysiloxane according to claim 1, wherein said formula (I) is

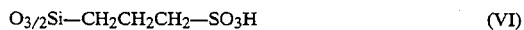

5. The shaped organopolysiloxane according to claim 1 having the following composition:

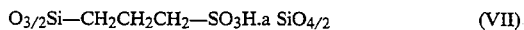

in which a is a number from 4 to 20.

6. The shaped organopolysiloxane according to claim 1 having the following composition:

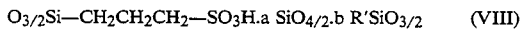

in which a and $b \geq 1$ and the sum of a and b is a number from 4 to 20 and R' has the same meaning as in claim 1.

7. The shaped organopolysiloxane according to claim 1 having the following composition:

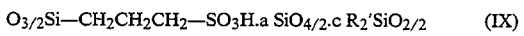

in which a and $c \geq 1$ and the sum of a and c is a number from 4 to 20 and R' has the same meaning as in claim 1.

8. The shaped organopolysiloxane according to claim 1 having the following composition:

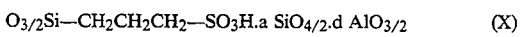

in which a and $d \geq 1$ and the sum of a and d is a number from 4 to 20.

9. The shaped organopolysiloxane according to claim 1 having the following composition:

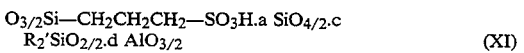

in which a, c and $d \geq 1$ and the sum of a, c and d is a number from 4 to 20.

10. The shaped organopolysiloxane according to claim 1 which is a statistical copolycondensate in regards to the units corresponding to formulae (I) and (IV).

11. The shaped organopolysiloxane according to claim 1 which is a block or mixed copolycondensate in regards to the units corresponding to formulae (I) and (IV).

12. A process for the production of a shaped organopolysiloxane comprising sulfonate groups and units corresponding to the following formula (I):

in which $R^1$ is a linear or branched $C_{1-12}$ alkylene group, a $C_{5-8}$ cycloalkylene group or a unit corresponding to the formula (II) or (III):

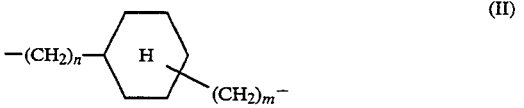

or

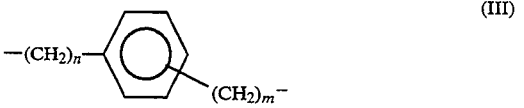

n and m are numbers from 0 to 6, x is a number from 1 to 4 depending on M, and M is hydrogen or a monovalent to tetravalent optionally complex metal ion, and the valencies of the silicon linked oxygen atoms are saturated by silicon atoms of other groups (I) and/or by one or more metal atom oxygen groups of the crosslinking bridge members (IV):

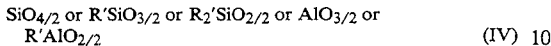

$SiO_{4/2}$ or $R'SiO_{3/2}$ or $R_2'SiO_{2/2}$ or $AlO_{3/2}$ or $R'AlO_{2/2}$     (IV)

where R' is a linear or branched $C_{1-5}$ alkyl group or a phenyl group, the ratio of the silicon atoms in (I) to the sum of the silicon and aluminum atoms of said crosslinking agent (IV) being from 1:4 to 1:20, wherein said shaded organopolysiloxane is a macroscopically spherical particle having a diameter of 0.01 to 3 mm, a specific surface of 0.01 to 1200 m²/g, a specific pore volume of 0.01 to 6 ml/g, and an apparent density of 50 to 1000 g/l, said process comprising:

(a) reacting (i) an aqueous solution of a sulfonated organosilicon compound corresponding to the following formula (XII):

$(HO)_3Si—R—SO_3H$     (XII)

or siloxane derivatives thereof condensed via oxygen bridges, $R^1$ being a linear or branched $C_{1-12}$ alkylene group, a $C_{5-8}$ cycloalkylene group or a unit corresponding to the following formula (II) or (III):

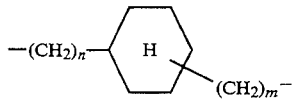

(II)

or

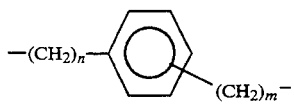

(III)

n and m are numbers from 0 to 6 according to the desired stoichiometric composition of the organopolysiloxane to be produced, with (ii) one or more crosslinker components (XIII):

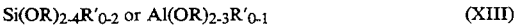

$Si(OR)_{2-4}R'_{0-2}$ or $Al(OR)_{2-3}R'_{0-1}$     (XIII)

or derivatives condensed via oxygen bridges,

R' being a linear or branched $C_{1-5}$ alkyl group or a phenyl group, with stirring below or at room temperature to 100° C. in the presence or absence of a substantially water-miscible solvent to form a reaction mixture;

(b) gelling said reaction mixture below or at room temperature to 100° C.; adding 5 to 1000% by weight of a substantially water-miscible solvent or water to the developing gel, optionally at the beginning of gel formation or up to 1 hour thereafter, said % by weight based on the total quantity in said aqueous solution of sulfonated organosilicon compound (XII) and crosslinker component (XIII);

(c) homogenizing the product of step (b) to form a viscous homogenizate;

(d) adding 20 to 2000% by weight of a substantially water-insoluble solvent to said viscous homogenizate either immediately or over a period of up to 2 hours, optionally with an increase in the temperature originally adjusted, wherein said % by weight is based on the total quantity in said aqueous solution of sulfonated organosilicon compound (XII) and crosslinker component (XIII); the siloxane-containing aqueous phase is dispersed in the liquid two-phase system and the solid forming as spheres is separated from the liquid phase after a sufficient reaction time at room temperature to 200° C. and is then optionally: extracted, dried at room temperature to 200° C., optionally in an inert gas atmosphere or in vacuo, and tempered for 1 to 100 hours at 150° to 230° C. and/or graded into particle sizes.

13. The process according to claim 12, wherein 5 to 100% by weight of a substantially water-miscible solvent or water is added to the developing gel.

14. The process according to claim 12, wherein 50 to 500% by weight of a substantially water-insoluble solvent is added to said viscous homogenizate.

15. The process according to claim 12, wherein said aqueous solution of said sulfonated organosilicon compound (XII) has an H+ content of 0.1 to 2.5 mol/l.

16. The process according to claim 12, wherein said aqueous solution of said sulfonated organosilicon compound (XII) has an H+ content of 0.5 to 1.5 mol/l.

17. The process according to claim 12, wherein said water-miscible solvent is a linear or branched $C_{1-5}$ alcohol.

18. The process according to claim 12, wherein said gelling is carried out at room temperature to 80° C. under normal pressure or an excess pressure which corresponds to the sum of the partial pressures of the components at the particular temperature applied.

19. The process according to claim 12, wherein in step (b) 5 to 300% by weight of a linear or branched $C_{1-5}$ alcohol or water is added to the developing gel either at the beginning of gel formation or up to 1 hour thereafter and wherein said % by weight is based on the total quantity in said aqueous solution of sulfonated organosilicon compound (XII) and crosslinker component (XIII).

20. The process according to claim 19, wherein 5 to 50% by weight of a linear or branched $C_{1-5}$ alcohol or water is added.

21. The process according to claim 12, wherein said substantially water-insoluble solvent, in which the siloxane-containing aqueous phase is dispersed, is toluene, o-, m-, p-xylene, a cyclic or open-chain hydrocarbon containing 5 to 8 carbon atoms, or a corresponding mixture thereof.

22. The process according to claim 12, further comprising an aftertreatment of said shaped organopolysiloxane comprising heat-treating said undried spheres for 1 hour to up to 1 week at 50° to 300° C. in the presence of at least the water component in the liquid phase optionally under excess pressure.

23. The process according to claim 22, wherein said temperature is from 100° to 200° C.

24. The process according to claim 22, wherein said aftertreatment is carried out in the presence of an inorganic or organic acid or in the presence of a metal component acting as a condensation catalyst.

25. The process according to claim 24, wherein said acid is hydrochloric acid.

26. The process according to claim 12, wherein a low-boiling alcohol is used to extract the spherical solid formed.

27. The process according to claim 12, wherein in step (a) said stirring is in the absence of a substantially water-miscible solvent.

28. The process according to claim 12, further comprising reacting said spheres in which $M^{x+}=H^+$ with an inorganic or organic reagent, capable of dissociating into an optionally complex cation and an anion on the static or dynamic ion exchange principle with exchange of $H^+$ for $M^{x+}$, to form a reaction product which is subsequently washed and is then optionally freed from the liquid phase, optionally dried.

29. A shaped organopolysiloxane comprising sulfonate groups and units corresponding to the following formula (I):

in which $R^1$ is a linear or branched $C_{1-12}$ alkylene group, a $C_{5-8}$ cycloalkylene group or a unit corresponding to the formula (II) or (III):

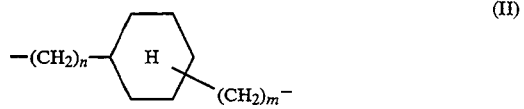

or

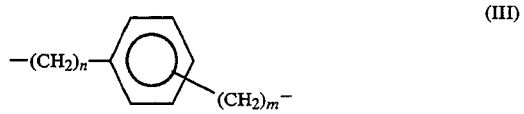

where n and m are numbers from 0 to 6, x is a number from 1 to 4 depending on M, and M is hydrogen or a monovalent to tetravalent optionally complex metal ion, and the valencies of the silicon linked oxygen atoms are saturated by silicon atoms of other groups (I) and/or by one or more metal atom oxygen groups of the crosslinking bridge members (IV):

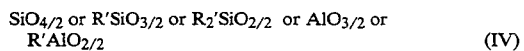

where R' is a linear or branched $C_{1-5}$ alkyl group or a phenyl group,
the ratio of the silicon atoms in (I) to the sum of the silicon and aluminum atoms of said crosslinking agent (IV) being from 1:4 to 1:20,
wherein said shaped organopolysiloxane is a macroscopically spherical particle having a diameter of 0.01 to 3 mm, a specific surface of 0.01 to 1200 m²/g, a specific pore volume of 0.01 to 6 ml/g, and an apparent density of 50 to 1000 g/l; said shaped organopolysiloxane produced by a process comprising:
(a) reacting (i) an aqueous solution of a sulfonated organosilicon compound corresponding to the following formula (XII):

or siloxane derivatives thereof condensed via oxygen bridges, $R^1$ being a linear or branched $C_{1-12}$ alkylene group, a $C_{5-8}$ cycloalkylene group or a unit corresponding to the following formula (II) or (III):

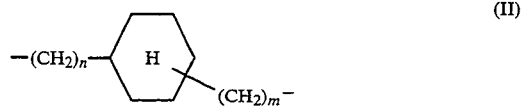

or

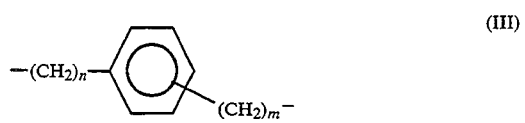

where n and m are numbers from 0 to 6 according to the desired stoichiometric composition of the organopolysiloxane to be produced, with (ii) one or more crosslinker components (XIII):

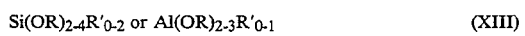

or derivatives condensed via oxygen bridges,
R' being a linear or branched $C_{1-5}$ alkyl group or a phenyl group, with stirring below or at room temperature to 100° C. in the presence or absence of a substantially water-miscible solvent to form a reaction mixture;
(b) gelling said reaction mixture below or at room temperature to 100° C.; adding 5 to 1000% by weight of a substantially water-miscible solvent or water to the developing gel, optionally at the beginning of gel formation or up to 1 hour thereafter, said % by weight based on the total quantity in said aqueous solution of sulfonated organosilicon compound (XII) and crosslinker component (XIII);
(c) homogenizing the product of step (b) to form a viscous homogenizate;
(d) adding 20 to 2000% by weight of a substantially water-insoluble solvent to said viscous homogenizate either immediately or over a period of up to 2 hours, optionally with an increase in the temperature originally adjusted, wherein said % by weight is based on the total quantity in said aqueous solution of sulfonated organosilicon compound (XII) and crosslinker component (XIII); the siloxane-containing aqueous phase is dispersed in the liquid two-phase system and the solid forming as spheres is separated from the liquid phase after a sufficient reaction time at room temperature to 200° C. and is then optionally: extracted, dried at room temperature to 200° C., optionally in an inert gas atmosphere or in vacuo, and tempered for 1 to 100 hours at 150° to 230° C. and/or graded into particle sizes.

30. A shaped organopolysiloxane consisting essentially of sulfonate groups and units corresponding to the following formula (I):

in which $R^1$ is a linear or branched $C_{1-12}$ alkylene group, a $C_{5-8}$ cycloalkylene group or a unit corresponding to the formula (II) or (III):

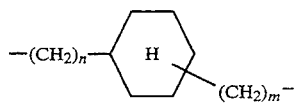

or

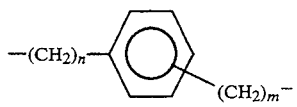

n and m are numbers from 0 to 6, x is a number from 1 to 4 depending on M, and M is hydrogen or a monovalent to tetravalent optionally complex metal ion, and the valencies of the silicon linked oxygen atoms are saturated by silicon atoms of other groups (I) and/or by one or more metal atom oxygen groups of the crosslinking bridge members (IV):

$$SiO_{4/2} \text{ or } R'SiO_{3/2} \text{ or } R_2'SiO_{2/2} \text{ or } AlO_{3/2} \text{ or } R'AlO_{2/2} \quad (IV)$$

where R′ is a linear or branched $C_{1-5}$ alkyl group or a phenyl group, the ratio of the silicon atoms in (I) to the sum of the silicon and aluminum atoms of said crosslinking agent (IV) being from 1:4 to 1:20, wherein said shaped organopolysiloxane is a macroscopically spherical particle having a diameter of 0.01 to 3 mm, a specific surface of 0.01 to 1200 m²/g, a specific pore volume of 0.01 to 6 ml/g, and an apparent density of 50 to 1000 g/l.

31. The shaped organopolysiloxane according to claim 30, said shaped organopolysiloxane produced by a process comprising:

(a) reacting (i) an aqueous solution of a sulfonated organosilicon compound corresponding to the following formula (XII):

$$(HO)_3Si-R-SO_3H \quad (XII)$$

or siloxane derivatives thereof condensed via oxygen bridges, $R^1$ being a linear or branched $C_{1-12}$ alkylene group, a $C_{5-8}$ cycloalkylene group or a unit corresponding to the following formula (II) or (III):

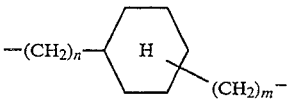

or

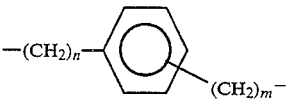

where n and m are numbers from 0 to 6 according to the desired stoichiometric composition of the organopolysiloxane to be produced, with (ii) one or more crosslinker components (XIII):

$$Si(OR)_{2-4}R'_{0-2} \text{ or } Al(OR)_{2-3}R'_{0-1} \quad (XIII)$$

or derivatives condensed via oxygen bridges,

R′ being a linear or branched $C_{1-5}$ alkyl group or a phenyl group, with stirring below or at room temperature to 100° C. in the presence or absence of a substantially water-miscible solvent to form a reaction mixture;

(b) gelling said reaction mixture below or at room temperature to 100° C.; adding 5 to 1000% by weight of a substantially water-miscible solvent or water to the developing gel, optionally at the beginning of gel formation or up to 1 hour thereafter, said % by weight based on the total quantity in said aqueous solution of sulfonated organosilicon compound (XII) and crosslinker component (XIII);

(c) homogenizing the product of step (b) to form a viscous homogenizate;

(d) adding 20 to 2000% by weight of a substantially water-insoluble solvent to said viscous homogenizate either immediately or over a period of up to 2 hours, optionally with an increase in the temperature originally adjusted, wherein said % by weight is based on the total quantity in said aqueous solution of sulfonated organosilicon compound (XII) and crosslinker component (XIII); the siloxane-containing aqueous phase is dispersed in the liquid two-phase system and the solid forming as spheres is separated from the liquid phase after a sufficient reaction time at room temperature to 200° C. and is then optionally: extracted, dried at room temperature to 200° C., optionally in an inert gas atmosphere or in vacuo, and tempered for 1 to 100 hours at 150° to 230° C. and/or graded into particle sizes.

* * * * *